United States Patent Office 3,732,232
Patented May 8, 1973

3,732,232
PROCESS FOR THE PREPARATION OF IMIDAZOISOQUINOLINEDIONE COMPOUNDS
Erik Regel, Wuppertal-Cronenberg, Ludwig Eue, Cologne, and Karl Heinz Buchel, Wuppertal-Elberfeld, Germany, assignors to Farbenfabriken Bayer Aktiengesellschaft, Leverkusen, Germany
No Drawing. Filed Aug. 30, 1971, Ser. No. 176,251
Claims priority, application Germany, Sept. 3, 1970,
P 20 43 649.1
Int. Cl. C07d 57/04
U.S. Cl. 260—288 R        24 Claims

ABSTRACT OF THE DISCLOSURE

Imidazoisoquinolinediones of the formula

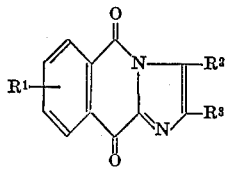

are prepared smoothly and without substantial by-product formation by reacting a phthalic acid halide of the formula

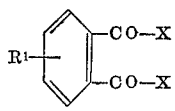

with an imidazole of the formula

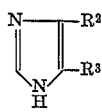

$R^1$ is hydrogen, alkyl, halogen, nitro or alkoxy, or aryl which may be substituted by alkyl, halogen, haloalkyl or nitro, $R^2$ and $R^3$ individually are hydrogen, alkyl, aryl or halogen or, together with the intermediate two carbon atoms of the imidazole ring, represent a benzene ring, which may be substituted by halogen, nitro or trifluromethyl; and X is halogen, preferably chlorine. The products are herbicides.

---

The present invention relates to a novel process for the preparation of certain herbicidal imidazoisoquinolinedione compounds.

It is known that, in some cases, an acyl imidazole can be prepared by oxidation of the corresponding methylene compound to produce the carbonyl group of the acyl compound. For example, 2-benzoylimidazole can be prepared by oxidation of 2-benzylimidazole by means of chromic acid (Chem. Ber. 66, 1900 (1933)). In a corresponding manner, benzimidazo-(1,2-b)-isoquinoline-5,12-dione can be obtained by oxidation of benzimidazo-(1,2-b)-isoquinoline-5-(12H)-one (J. Org. Chem. 31, 1948 (1966)).

Acyl imidazoles are, however, generally very difficult to obtain, since the starting materials required for an oxidation of the type described above are, at best, available only in exceptional cases. Hitherto, it has not been possible to convert imidazoles to their C-acyl derivatives under the conditions of the Friedel-Craft's reaction (K. Hofmann, "Imidazole and Its Derivatives," in The Chemistry of Heterocyclic Compounds, Interscience Publ. Inc., New York 1953).

If an attempt is made with customary acylating agents to acylate imidazole, at first only the hydrogen atom on the nitrogen is replaced by the acyl radical. The action of further acylating agent gives rise to various by-products by a reaction mechanism which is not clear.

The present invention provides a process for the preparation of an imidazoisoquinolinedione of the general formulae:

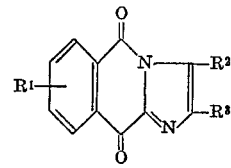

in which $R^1$ is hydrogen, alkyl, halogen, nitro or alkoxy, or aryl which may be substituted by alkyl, halogen, haloalkyl or nitro, and $R^2$ and $R^3$ individually are hydrogen, alkyl, aryl or halogen, or together with the intermediate two carbon atoms of the imidazole ring, represent a benzene ring, which may be substituted by halogen, nitro or trifluromethyl.

The instant process comprises reacting a phthalic acid halide of the general formula:

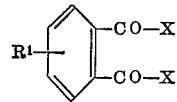

in which $R^1$ is defined as above, and

X is halogen, preferably chlorine, in the presence of a polar diluent or solvent and in the presence of a base, with an imidazole compound of the general formula:

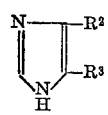

in which $R^2$ and $R^3$ are identified as above.

In the Formula 2, as in Formula 1, $R^1$ is preferably hydrogen, alkyl with 1–6 carbon atoms, chlorine, bromine, fluorine, nitro or alkoxy with 1–4 carbon atoms, or phenyl which is preferably substituted by alkyl with 1–6 carbon atoms, chlorine, bromine, fluorine, chloromethyl or trifluoromethyl. In Formula 3, as in Formula 1, $R^2$ and $R^3$ are preferably hydrogen, alkyl with 1–6 carbon atoms, chlorine, bromine, fluorine or phenyl or, together with the intermediate two carbon atoms of the imidazole ring, stand for a benzene ring.

It is decidedly surprising that in the process according to the present invention, imidazoisoquinolinediones may be obtained in a simple manner and in good yields and that the acylation takes place only in the 2-position of the imidazole ring and not in the 4- or 5-position.

Surprisingly, the acylation of the imidazole compounds with phthalic acid halides according to the present invention proceeds smoothly and virtually without the formation of by-products, whereas with other acylating agents, imidazoles react in an extremely unclear manner with the formation of numerous by-products after the imino-nitrogen has been acylated.

If imidazole and phthalic acid dichloride are used as starting materials in the process of the present invention, the reaction course may be represented by the following equations:

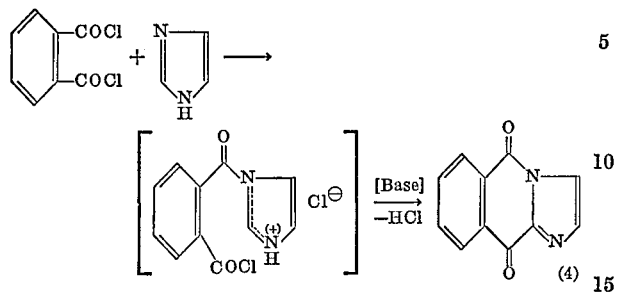

The phthalic acid halides of the Formula 2 are known. As typical examples of the phthalic acid halides of the Formula 2, there may be mentioned:

phthalic acid dichloride,
4-chlorophthalic acid dichloride,
4-bromophthalic acid dichloride,
3-nitrophthalic acid dichloride,
4-nitrophthalic acid dichloride,
4-phenylphthalic acid dichloride,
4-methoxyphthalic acid dichloride,
4-tert.-butylphthalic acid dichloride.

The imidazole compounds of the Formula 3 are also known. As examples of the imidazoles which can be used, there may be mentioned: imidazole, 4-methylimidazole, 5-methylimidazole, 5-ethylimidazole, 4-ethylimidazole, 4-propylimidazole, 5-propylimidazole, 4,5-diphenylimidazole, 4-chloroimidazole, 5-bromoimidazole, benzimidazole, 6-chlorobenzimidazole, 6-nitrobenzimidazole, 5-trifluoromethylbenzimidazole.

The reaction according to the present invention must be carried out in the presence of a polar diluent or solvent, in particular a strongly polar diluent or solvent, by which is meant, for the purposes of this specification, an inert organic solvent which has a dielectric constant of at least 4.8 (that of chloroform), preferably of at least 20.7 (that of acetone). Preferred solvents are amides, such as dimethylformamide, and nitriles, such as acetonitrile.

Furthermore, it is necessary that the reaction be carried out in the presence of a base, in particular a strong base. For the purposes of this specification the expression "strong base" refers to any tertiary amine having a basicity constant $pK_b$ of not more than 8.7, preferably not more than 3.3. These include aliphatic amines, such as triethylamine and trimethylamine, as well as α-picoline and the lutidines.

The reaction temperatures can be varied within a fairly wide range. In general, the reaction is carried out at —10° to +150° C., preferably at 0° to 70° C.

When carrying out the process of the invention, the reactants and the strong base are, in general, used in substantially equimolar amounts. The working-up of the reaction mixtures obtained is effected using customary methods.

Benzimidazo-(1,2-b)isoquinoline-5,12-dione is known; it can be used as an intermediate for vat dyes (J. Org. Chem. 31, 1498 (1966).

Certain of the compounds produced according to the invention are new compounds; specifically the imidazo-isoquinolinediones of the general formula:

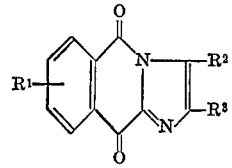

in which

R¹ is hydrogen, alkyl, halogen, nitro or alkoxy, or aryl which may be substituted by alkyl, halogen, haloalkyl or nitro, and R² and R³ independently stand for hydrogen, alkyl, aryl or halogen; are novel compounds.

The process of the present invention is illustrated in and by the following preparative examples.

EXAMPLE 1

Preparation of imidazo-isoquinolinedione

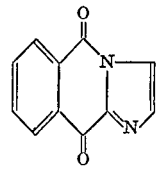

To a solution of 203 g. (1 mole) phthalic acid dichloride in 1000 ml. acetonitrile there was added dropwise, with cooling, a solution of 68 g. (1 mole) imidazole and 202 g. (2 mole) triethylamine in 800 ml. acetonitrile. The reaction mixture was afterwards stirred over night. The precipitated triethylammonium chloride and the imidazo-isoquinolinedione formed were filtered off and the product was freed from triethylammonium chloride by washing with water. The crystals were purified by recrystallisation from dimethyl formamide. 91.5 g. (46% of the theory) of pure imidazo-iso-quinolinedione were obtained. M.P. 236° C.

If the crystalline crude product was only stirred together with cold dimethylformamide, there were obtained, after filtration and drying, 154.8 g. (78% of the theory) of almost pure imidazo-isoquinolinedione.

EXAMPLE 2

Preparation of 2,3-diphenylimidazoisoquinolinedione

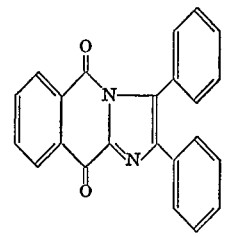

To a solution of 101.5 g. (0.5 mole) phthalic acid dichloride in 500 ml. acetonitrile there was added dropwise, with cooling, a suspension of 109.5 g. (0.5 mole) 5,5-diphenylimidazole and 101 g. (1 mole) triethylamine in 1000 ml. acetonitrile. The reaction mixture was afterwards stirred over night. The precipitated triethylammonium chloride and the diphenylimidazoisoquinolinedione were filtered off and the product was freed from triethylammonium chloride by washing with water. The crystals were purified by recrystallisation from dimethylformamide.

46 g. (26% of the theory) of pure 2,3-diphenylimidazo-isoquinolinedione were obtained. M.P. 290° C.

EXAMPLE 3

Preparation of benzimidazo-(1,2-b)-iso-quinolinedione

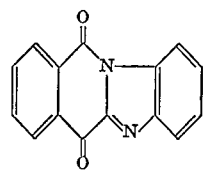

To a solution of 101.5 g. (0.5 mole) phthalic acid dichloride in 1000 ml. acetonitrile there was added dropwise with cooling, a suspension of 59 g. (0.5 mole) benzimidazole and 101 g. (1 mole) triethylamine in 800 ml. acetonitrile.

The reaction mixture was afterwards stirred over night. The precipitated triethylammonium chloride and the benzimidazo-iso-quinolinedione were filtered off and the product was freed from triethylammonium chloride by washing with water.

The crystals were purified by recrystallisation from dimethyl formamide.

41.5 g. (33% of the theory) of pure benzimidazo-(1,2-b)-iso-quinolinedione were obtained. M.P. 270° C.

EXAMPLE 4

Preparation of 3-nitrobenzimidazo-isoquinolinedione

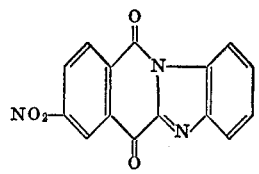

To a solution of 74.4 g. (0.3 mole) 4-nitrophthalic acid dichloride in 500 ml. acetonitrile there were added dropwise, with cooling, a solution of 35.4 g. (0.3 mole) benzimidazole and 60.6 g. (0.6 mole) triethylamine in 1000 ml. acetonitrile. The reaction mixture was afterwards stirred overnight. The precipitated triethylammonium chloride and the nitrobenzimidazoisoquinoline-dione were filtered off and the product was freed from triethylammonium chloride by washing with water. The crystals were purified by recrystallisation from dimethyl formamide.

22 g. (25% of the theory) of pure 3-nitrobenzimidazo-isoquinolinedione were obtained. M.P. 280° C.

EXAMPLE 5

Preparation of 2,8-dichlorobenzimidazo-isoquinolinedione

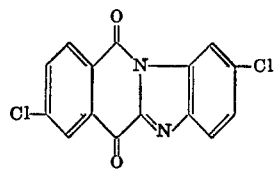

To a solution of 47.4 g. (0.2 mole) 4-chlorophthalic acid chloride in 300 ml. acetonitrile there was added dropwise with cooling, a solution of 30.7 g. (0.2 mole) 6-chlorobenzimidazole and 40.4 g. (0.4 mole) triethylamine in 600 ml. acetonitrile. The reaction mixture was afterwards stirred for 9 days. The precipitated triethylammonium chloride and the dichlorobenzimidazo-isoquinolinedione were filtered off and the product was freed from triethylammonium chloride by washing with water. The crystals were purified by recrystallization from dimethylformamide.

13.6 g. (22% of the theory) of pure 2,8-dichlorobenzimidazo-isoquinolinedione were obtained. M.P. 250° C.

In a manner analogous to that of Examples 1 to 5, the following compounds can be prepared. The positioning of substituents is stated according to the following system of numbering.

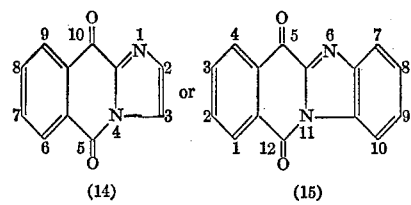

TABLE 1

| Example number | Chemical name | Melting point, C. |
|---|---|---|
| 6 | 8-nitro-imidazo-isoquinoline-5,10-dione | 218 |
| 7 | 9-nitro-imidazo-isoquinoline-5,10-dione | 220 |
| 8 | 8-chloro-imidazo-isoquinoline-5,10-dione | 170 |
| 9 | 8-bromo-imidazo-isoquinoline-5,10-dione | 182 |
| 10 | 8-phenyl-imidazo-isoquinoline-5,10-dione | 228 |
| 11 | 2,3,8-triphenyl-imidazo-isoquinoline-5,10-dione | 280 |
| 12 | 2-(or 3)-methyl-imidazoisoquinoline-5,10-dione | 201 |
| 13 | 7-methoxy-imidazo-isoquinoline-5,10-dione | 194 |
| 14 | 2-(or 3)-methyl-7-methoxy-imidazo-isoquinoline-5,10-dione | 217 |
| 15 | 2-(or 3)-methoxy-benzimidazo-(1,2-b)-isoquinoline-5,12-dione | 242 |
| 16 | 3-bromo-benzimidazo-(1,2-b)isoquinoline-5,12-dione | 254 |
| 17 | 2-(or 3)methyl-8-nitro-imidazo-isoquinoline-5,10-dione | 246 |
| 18 | 1-nitro-benzimidazo-(1,2-b)-isoquinoline-5,12-diene | 310 |
| 19 | 8-(or 9)-chloro-benzimidazo-(1,2-b)-isoqunioline-5,12-dione | 270 |
| 20 | 8-(or 9)-chloro-2-methoxy-benzimidazo-(1,2-b)-isoquinoline-5,12-dione | 258 |
| 21 | 8-(or 9)-chloro-3-bromo-benzimidazo-(1,2-b)-isoquinoline-5,12-dione | 280 |
| 22 | 3-chloro-benzimidazo-(1,2-b)-isoquinoline-5,12-dione | 258 |
| 23 | 8-(or 9)-chloro-1-nitrobenzimidazo-(1,2-b)-isoquinoline-5,12-dione | 280 |
| 24 | 8-(or 9)-chloro-3-nitro-benzimidazo-(1,2-b)-isoquinoline-5,12-dione | 270 |
| 25 | 8-(or 9)-trifluoromethylbenzimidazo-(1,2-b)-isoquinoline-5,12-dione | 270 |
| 26 | 7-tert.-butyl-imidazo-isoquinoline-5,10-dione | 220 |
| 27 | 2-tert.-butyl-benzimidazo-(1,2-b)-isoquinoline-5,12-dione | 245 |
| 28 | 8-(or 9)-nitrobenzimidazo-(1,2-b)-isoquinoline-5,12-dione | 238 |
| 29 | 3-nitro-8(or 9)-trifluoromethylbenzimidazo-(1,2-b)-isoquinoline-5,12-dione | 312 |
| 30 | 3-chloro-8(or 9)-trifluoromethylbenzimidazo-(1,2-b)-isoquinoline-5,12-dione | 304 |
| 31 | 8-fluoro-imidazo-isoquinoline-5,10-dione | 180 |
| 32 | 8-iodo-imidazo-isoquinoline-5,10-dione | 216 |

EXAMPLE 31

Chlorination of imidazoisoquinolinedione to give dichloroimidazoisoquinolinedione

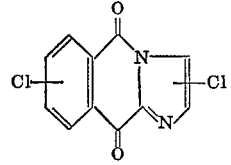

40 g. (0.2 mole) imidazo-isoquinolinedione (prepared according to Example 1) were dissolved in 400 ml. tetrachloroethane at 140° C.; a spatular-tipful of iron (III) chloride was added as catalyst, and chlorine gas was introduced at 140° C. for 8 hours. The separated dichloroimidazo-isoquinoline dione was filtered off and dried at 80° C.

25 g. (47% of theory) of pure dichlorimidazo-isoquinolinedione were obtained. M.P. 238° C.

The imidazoisoquinolinediones which can be prepared according to this invention show surprising herbicidal properties and can therefore be used for the control of weeds.

By weeds in the widest sense are meant all plants which grow in places where they are undesired. When large amounts are applied per unit area, the imidazoisoquinolinediones act as total herbicides, but when small amounts are applied they can be used very well for selective weed control.

The active compounds obtainable according to the invention can be used, for example, in the case of the following plants: dicotyledons, such as mustard (Sinapis), cress (Lepidium), cleavers (Galium), common chickweed (Stellaria), chamomile (Matricaria), gallant soldier (Galinsoga), goosefoot (Chenopodium), animal nettle (Urtica), groundsel (Senecio), cotton (Gossypium), beets (Beta), carrots (Daucus), beans (Phaseolus), potatoes (Solanum), coffee (Coffea); monocotyledons, such as timothy (Phleum), bluegrass (Poa), fescue (Festuca), goosegrass (Eleusine), foxtail (Setaria), ryegrass (Lolium), cheat (Bromus), barnyard grass (Echinochloa), maize (Zea), rice (Oryza), oats (Avena), barley (Hordeum), wheat (Triticum), millet (Panicum) and sugar cane (Saccharum).

The active compounds are especially suitable for selective control in cotton, beans, cereals, maize, rice and carrots.

The active compounds according to the present invention can be converted into the usual formulations, such as solutions, emulsions, suspensions, powders, pastes and granulates. These may be produced in known manner, for example by mixing the active compounds with extenders, that is, liquid or solid or liquefied gaseous diluents or carriers, optionally with the use of surface-active agents, that is, emulsifying agents and/or dispersing agents. In the case of the use of water as an extender, organic solvents can, for example, also be used as auxiliary solvents.

As liquid diluents or carriers, there are preferably used aromatic hydrocarbons, such as xylenes or benzene, chlorinated aromatic hydrocarbons, such as chlorobenzenes, paraffins, such as mineral oil fractions, alcohols, such as methanol or butanol, or strongly polar solvents, such as dimethyl formamide or dimethyl sulfoxide, as well as water.

As solid diluents or carriers, there are preferably used ground natural minerals, such as kaolins, clays, talc or chalk, or ground synthetic minerals, such as highly-dispersed silicic acid or silicates.

Preferred examples of emulsifying agents include nonionic and anionic emulsifiers, such as polyoxyethylene-fatty acid esters, polyoxyethylene-fatty alcohol ethers, for example alkylarylpolyglycol ethers, alkyl sulphonates and aryl sulphonates; and preferred examples of dispersing agents include lignin, sulphite waste liquors and methyl cellulose.

By liquefied gaseous diluents or carriers are meant liquids which would be gaseous at normal temperatures and pressures, for example aerosol propellants, such as halogenated hydrocarbons, for example Freon.

The active compounds according to the invention may be present in the formulations in admixture with other active compounds. The formulations contain, in general, from 0.1 to 95, preferably from 0.5 to 90 percent by weight of active compound.

The active compounds may be applied as such or in the form of their formulations or of the application forms prepared therefrom, such as ready-to-use solutions, emulsions, suspensions, powders, pastes and granulates. Application may take place in any usual manner, for example by dusting, spraying, squirting, watering or scattering.

The active compounds can be used both before the emergence and after the emergence of the plants.

The applied amount of active compounds may vary within fairly wide ranges. It depends essentially on the nature of the desired effect. In general, the applied amounts are 0.1 to 20 kg. of active compound per hectare, preferably 1 to 10 kg. per hectare.

The compounds obtainable according to the invention of the general Formula 1 can also be readily converted by chlorination to give chlorinated derivatives which likewise can be used as crop protection agents or as intermediates for the preparation of crop protection agents (see the preparative example herein). Such chlorinated derivatives are otherwise not, or only with very great difficulty, obtainable.

The compounds obtainable according to the invention also exhibit a fungicidal activity, particularly when applied as seed dressings or as soil treatment agents.

The present invention also provides a herbicidal composition containing as active ingredient a compound of the present invention in admixture with a solid or liquefied gaseous diluent or carrier or in admixture with a liquid diluent or carrier containing a surface-active agent.

The present invention also provides a method of combating weeds which comprises applying to the weeds or a weed habitat a compound of the present invention alone or in the form of a composition containing as active ingredient a compound of the present invention in admixture with a diluent or carrier.

The present invention further provides crops protected from damage by weeds by being grown in areas in which immediately prior to and/or during the time of the growing a compound of the present invention was applied alone or in admixture with a diluent or carrier. It will be seen that the usual methods of providing a harvested crop may be improved by the present invention.

The expression "compound of the present invention" herein may refer to a compound prepared by the process of the invention, to a new compound of the Formula 1 per se or to a chloro-derivative of either of such compounds.

The herbicidal activity of the compounds of the present invention is illustrated in and by the following test examples, in which the following compounds were used:

| Compound Number | Structure | Chemical name |
|---|---|---|
| 1 | (structure) | 8-chloro-imidazo-isoquinoline-5,10-dione. |
| 2 | (structure) | 8-bromo-imidazo-isoquinoline-5,10-dione. |
| 3 | (structure) | 7-(or 9-)chloro-imidazo-isoquinoline-5,10-dione. |
| 4 | (structure) | 8-methoxy-imidazo-isoquinoline-5,10-dione. |
| 5 | (structure) | Benzimidazo-isoquinoline-5,12-dione. |

The following tests were employed:

EXAMPLE A

Post-emergence test:

Solvent: 5 parts by weight acetone
Emulsifier: 1 part by weight alkylarylpolyglycol ether To produce a suitable preparation of active compound, 1 part by weight of active compound was mixed with the stated amount of solvent, the stated amount of emulsifier was added and the concentrate was then diluted with water to the desired concentration.

Test plants which had a height of 5–15 cm. were sprayed with the preparation of the active compound so that the amounts of active compound per unit area were stated in the table are applied. Depending on the concentration of the spray liquor, the amount of water applied lies between 1000 and 2000 litres/hectare.

After three weeks, the degree of damage to the plants was determined and characterised by the values 0–5 which had the following meaning:

0=no effect
1=a few slightly burnt spots
2=marked damage to leaves
3=some leaves and parts of stalks partially dead
4=plant partially destroyed
5=plant completely dead.

The active compounds, the amounts applied and the results can be seen from the following table:

TABLE 2.—POST-EMERGENCE TEST

| Active compound | Active compound applied, kg./hectare | Echino-chloa | Cheno-podium | Sinapis | Galin-soga | Stell-aria | Oats | Cotton | Wheat | Beans | Carrots |
|---|---|---|---|---|---|---|---|---|---|---|---|
| 1 | 4 | 5 | 5+ | 5 | 5 | 5 | 4-5 | 2 | 4 | 2 | 2 |
|  | 2 | 5 | 4-5 | 5 | 5 | 4-5 | 3-4 | 1 | 3 | 1 | 0 |
|  | 1 | 5 | 4 | 4-5 | 4 | 4 | 2 | 0 | 2 | 0 | 0 |
| 2 | 4 | 5 | 5 | 5 | 5 | 5 | 4 | 3 | 4 | 4 | 1 |
|  | 2 | 5 | 4-5 | 5 | 5 | 4-5 | 3 | 1 | 3 | 3 | 0 |
|  | 1 | 5 | 4 | 5 | 5 | 4 | 3 | 0 | 2 | 2 | 0 |
| 3 | 4 | 5 | 5 | 5 | 5 | 5 | 4-5 | 1 | 3-4 | 2 | 5 |
|  | 2 | 5 | 4-5 | 5 | 4 | 4 | 3 | 0 | 2 | 0 | 3 |
|  | 1 | 4 | 4 | 4-5 | 3-4 | 3 | 3 | 0 | 0 | 0 | 2 |
| 4 | 4 | 5 | 5 | 5 | 5 | 5 | 4-5 | 1 | 1-2 | 1 | 2 |
|  | 2 | 5 | 4 | 5 | 4-5 | 4 | 3 | 0 | 1 | 0 | 1 |
|  | 1 | 4 | 4 | 4 | 4 | 4 | 1 | 0 | 0 | 0 | 0 |

EXAMPLE B

Plastic pots of 1 litre capacity are half filled with soil. Weed seeds are then sown in and slightly worked into the soil. Rice plants in the 3–4 leaf stage are planted into these pots and the pots are so heavily watered that the water stands about 2–3 cm. above the soil. The water level is held constant by daily watering. Three days after transplanting, when the weed seeds have not yet germinated, or are just germinating, the active compounds are, as emulsions or dispersions, distributed in the water, and in such a manner that the application amounts stated in the table are applied. Those parts of the rice plants which project above the water do not come into contact with the active compound.

Three weeks after application, the degrees of damage to rice and weeds are determined visually. The following key is used:

0=no effect
1=slight damage or delay in growth
2=marked damage or inhibition of growth
3=heavy damage and only deficient development or only 50% emerged
4=plants partially destroyed after germination or only 25% emerged
5=plants completely dead.

The active compounds, the amounts applied and the results can be seen from the following table:

TABLE 3.—PRE-EMERGENCE TEST

| Active compound | Active compound applied, kg./hectare | Rice | Echino-chloa crus galli | Eleocha-ris acicula-ris | Mono-charia vagina-lis | Rotala indica | Linder-nia pro-cumbens |
|---|---|---|---|---|---|---|---|
| 1 | 6 | 1 | 5 | 5 | 5 | 5 | 5 |
|  | 3 | 0 | 4 | 4-5 | 4 | 5 | 4-5 |
| 5 | 6 | 0 | 5 | 0 | 5 | 5 | 5 |
|  | 3 | 0 | 4 | 0 | 4 | 4-5 | 4-5 |

It will be appreciated that the instant specification and examples are set forth by way of illustration and not limitation, and that various modifications and changes may be made without departing from the spirit and scope of the present invention.

What is claimed is:

1. Process for the production of an imidazoisoquinolinedione compound of the general formula:

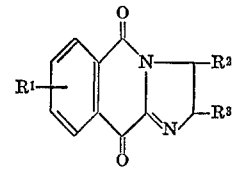

in which
R¹ is hydrogen, alkyl, halogen, nitro, alkoxy and substituted and unsubstituted aryl wherein the substituents are alkyl, halogen, haloalkyl or nitro, and
R² and R³ individually are hydrogen, alkyl, aryl or halogen and, together with the intermediate two carbon atoms of the imidazole ring, represent a benzene ring which may be substituted by halogen, nitro or trifluoromethyl, which process comprises reacting a phthalic acid halide of the general formula:

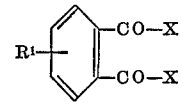

in which
R¹ is defined as above and X is halogen, in the presence of a polar diluent or solvent and in the presence of a base, with an imidazole compound of the general formula:

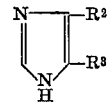

in which
R² and R³ are defined as above.

2. Process as claimed in claim 1, in which X is chlorine.
3. Process as claimed in claim 1 wherein R¹ is hydrogen, halogen or nitro.
4. Process as claimed in claim 1 wherein R¹ is alkyl of from 1 to 6 carbon atoms.
5. Process as claimed in claim 1 wherein R¹ is alkoxy of from 1 to 4 carbon atoms.
6. Process as claimed in claim 1 wherein R¹ is phenyl.
7. Process as claimed in claim 1 wherein R¹ is substituted phenyl wherein the substituents are selected from the group consisting of alkyl of from 1 to 6 carbon atoms, chlorine, bromine, fluorine, chloromethyl or trifluoromethyl.

8. Process as claimed in claim 1 wherein $R^2$ and $R^3$, independently of each other, are hydrogen, alkyl of from 1 to 6 carbon atoms.

9. Process as claimed in claim 1 wherein $R^2$ and $R^3$ taken together with the intermediate two carbon atoms of the imidazole ring to which they are attached, represent a benzene ring.

10. Process as claimed in claim 1 wherein the reaction is effected in the presence of a polar organic solvent.

11. Process as claimed in claim 10 wherein said solvent has a dielectric constant of at least 4.8.

12. Process as claimed in claim 10 wherein said solvent has a dielectric solvent of at least 20.7.

13. Process as claimed in claim 1 in which said base is a tertiary amine.

14. Process as claimed in claim 13 wherein said amine is triethylamine, trimethylamine, α-picoline or a lutidine.

15. Process as claimed in claim 1 wherein the reaction is effected at from about 0 to 70° C.

16. Process as claimed in claim 1 wherein phthalic acid dichloride is reacted with imidazole to form imidazoisoquinolinedione.

17. Process as claimed in claim 1 wherein phthalic acid dichloride is reacted with 4,5-diphenyl-imidazole to form 2,3-diphenylimdiazoisoquinolinedione.

18. Process as claimed in claim 1 wherein phthalic acid dichloride is reacted with benzimidazole to form benzimidazo-iso-quinolinedione.

19. Process as claimed in claim 1 wherein 4-nitrophthalic acid dichloride is reacted with benzimidazole to form 3-nitrobenzimidazoisoquinolinedione.

20. Process as claimed in claim 1 wherein 4-chlorophthalic acid chloride is reacted with 6-chlorobenzimidazole to form 2,8-dichlorobenzimidazo-isoquinolinedione.

21. Process as claimed in claim 1 wherein 3-chlorophthalic acid chloride is reacted with imidazole to form 8-chloro-imidazo-isoquinoline-5,10-dione.

22. Process as claimed in claim 1 wherein 3-bromophthalic acid chloride is reacted with imidazole to form 8-bromo-imidazo-isoquinoline-5,10-dione.

23. Process as claimed in claim 1 wherein 3-fluorophthalic acid chloride is reacted with imidazole to form 8-fluoro-imidazo-isoquinoline-5,10-dione.

24. Process as claimed in claim 1 wherein 3-iodophthalic acid chloride is reacted with imidazole to form 8-iodo-imidazo-isoquinoline-5,10-dione.

References Cited

UNITED STATES PATENTS

| | | | |
|---|---|---|---|
| 2,785,167 | 3/1967 | Schroeder | 260—288 R |
| 2,938,903 | 5/1960 | Boyle | 260—288 R |
| 3,084,165 | 4/1963 | Schellhammer et al. | 260—288 R |
| 3,108,108 | 10/1963 | Schellhammer et al. | 260—288 R |

FOREIGN PATENTS

| | | | |
|---|---|---|---|
| 1,951,157 | 6/1971 | Germany | 260—288 R |

DONALD G. DAUS, Primary Examiner

U.S. Cl. X.R.

71—94; 260—309, 309.2, 544, 694, 283 SY